US011740033B2

(12) United States Patent
Lawless (10) Patent No.: US 11,740,033 B2
(45) Date of Patent: Aug. 29, 2023

(54) HEAT EXCHANGER, EXCHANGER PLATE, AND METHOD OF CONSTRUCTION (71) Applicant: Lane Lawless, Tulsa, OK (US)

(72) Inventor: Lane Lawless, Tulsa, OK (US)

(73) Assignee: Lane Lawless, Tulsa, OK (US)

( * ) Notice: Subject to any disclaimer, the term of this patent is extended or adjusted under 35 U.S.C. 154(b) by 6 days.

(21) Appl. No.: 17/130,607

(22) Filed: Dec. 22, 2020

(65) Prior Publication Data
US 2022/0196343 A1 Jun. 23, 2022

(51) Int. Cl.
F28F 3/08 (2006.01)
F28D 1/02 (2006.01)
F28D 1/03 (2006.01)

(52) U.S. Cl.
CPC ............ *F28F 3/083* (2013.01); *F28D 1/0213* (2013.01); *F28D 1/035* (2013.01); *F28F 2275/125* (2013.01); *F28F 2280/02* (2013.01)

(58) Field of Classification Search
CPC ...... F28F 3/083; F28F 3/14; F28F 3/12; F28F 2275/125; F28F 2280/02; F28D 9/0006; F28D 9/0068; F28D 1/0206; F28D 1/0213; F28D 1/035
See application file for complete search history.

(56) References Cited

U.S. PATENT DOCUMENTS

| | | | |
|---|---|---|---|
| 1,961,660 A * | 6/1934 | Fehrmann | F28F 3/10 165/169 |
| 3,334,399 A | 8/1967 | Teeguarden | |
| 4,499,942 A | 2/1985 | Allison | |
| 5,359,989 A | 11/1994 | Chase et al. | |
| 5,509,468 A * | 4/1996 | Lopez | F28F 3/14 361/689 |
| 7,093,649 B2 | 8/2006 | Dawson | |
| 9,832,913 B2 | 11/2017 | Shedd | |
| 2001/0030042 A1 * | 10/2001 | Davidian | F25J 5/005 62/903 |
| 2004/0099712 A1 * | 5/2004 | Tonkovich | B01J 19/0093 228/183 |
| 2011/0079375 A1 * | 4/2011 | Nagurny | F28F 3/083 29/890.03 |
| 2011/0097244 A1 * | 4/2011 | Eaton | B01J 19/0013 422/138 |

(Continued)

FOREIGN PATENT DOCUMENTS

| | | | |
|---|---|---|---|
| CN | 204963606 U | | 1/2016 |
| CN | 207456244 U | * | 6/2018 |
| CN | 207456244 U | | 6/2018 |

(Continued)

OTHER PUBLICATIONS

Extended European Search Report; dated Jun. 17, 2021; EPO.

*Primary Examiner* — Devon Russell
(74) *Attorney, Agent, or Firm* — Dennis D. Brown; Brown Patent Law, P.L.L.C.

(57) ABSTRACT

A plate heat exchanger and methods of construction and use which allow the plate assemblies used in the exchanger to be easily cleaned and maintained and which allow the plate assemblies to be individually and separately removed from the exchanger for cleaning or maintenance while the exchanger remains online and while the other plate assemblies in the plate heat exchanger continue to operate.

19 Claims, 9 Drawing Sheets

(56) References Cited

U.S. PATENT DOCUMENTS

2014/0246184 A1* 9/2014 Byman .................. F28F 3/044
                                                        165/166
2017/0210059 A1* 7/2017 Pionetti .............. F16L 13/0263

FOREIGN PATENT DOCUMENTS

| CN | 208635603 U | | 3/2019 | | |
|----|----|----|----|----|----|
| CN | 208919732 U | * | 5/2019 | | |
| CN | 111306973 A | | 6/2020 | | |
| CN | 211475171 U | * | 9/2020 | | |
| GB | 2231395 | | 11/1990 | | |
| JP | 2013508657 A | * | 10/2010 | | |
| JP | 2012077378 A | * | 4/2012 | | |
| WO | WO-9010839 A | * | 9/1990 | ............... | F03G 7/04 |
| WO | WO-2012150271 A1 | * | 11/2012 | ............... | F24J 2/055 |
| WO | 2013094912 | | 6/2013 | | |
| WO | 2013106240 | | 7/2013 | | |
| WO | 2014062653 | | 4/2014 | | |

* cited by examiner

HEAT EXCHANGER, EXCHANGER PLATE, AND METHOD OF CONSTRUCTION

FIELD OF THE INVENTION

The present invention relates to plate heat exchangers, heat exchanger plates, and methods of construction and use.

BACKGROUND OF THE INVENTION

Plate heat exchangers are used in many applications. Plate heat exchangers typically comprise a series of plates which are compressed together with gaskets therebetween, or are brazed together, so that sealed spaces are provided between the plates which form a series of adjacent flow channels. When is use for exchanging heat between a first fluid (e.g., a warm fluid) and a second fluid (e.g., a cold fluid), the fluids flow through the adjacent flow channels in an alternating manner such that, e.g., the first fluid flows downwardly through the first channel, the second fluid flows upwardly through the next channel, the first fluid flows downwardly through the next channel, the second fluid flows upwardly through the next channel, etc.

One application which is of interest for plate heat exchangers is water-to-water heat exchange. While water-based heat exchange is exponentially more efficient that air, water often contains harsh minerals such as iron, manganese, calcium carbonate, or calcium sulphate which deposit and build up on the exchanger surfaces. This causes corrosion and significantly reduces heat transfer efficiency. If the system is not diligently maintained, the accumulation of these compounds will diminish the capacity of the system and can ultimately result in system failure.

Moreover, which using water of poor quality (e.g., lake, river, or ocean water) as a heating or cooling source, surface contamination and blockage caused by the presence of sediment and dirt, as well as the rapid growth of microorganisms, can require that the system be cleaned up to four times per year or more. Corrugations, which will typically be formed in the surfaces of the exchanger plates to create turbulence in the flow channels for increased heat transfer efficiency, also provide crevasses and edges in the plate surfaces which are ideal for hard mineral deposits to collect and solidify.

The required cleaning and maintenance of the plate heat exchanger will typically require a prolonged shutdown of the entire system, which affects business operations and profitability. It is not possible with the current designs of plate and plate frame heat exchangers to clean the exchanger plates without shutting down the exchanger system in its entirety. The regular maintenance of a typical plate heat exchanger involves the replacement of connection linings, bolts, and other frame parts. The plates typically require reconditioning by trained service personnel and the gaskets are prone to damage during disassembly, cleaning, and reassembly. While some repairs and maintenance can be performed on site, some reconditioning procedures require that the system or significant components thereof be shipped to a service center.

Consequently, a need exists for an improved plate heat exchanger system which is well suited for water-to-water heat exchange. The exchanger plate elements of the improved system will preferably be much easier and simpler to maintain and will preferably be individually removable for cleaning or maintenance while the remaining elements remain online and in use. In addition, the improved plate heat exchanger (i) will preferably allow the use of water of generally any quality, including seawater, (ii) will be highly durable, and (iii) will be highly resistant to exposure to corrosive, thermocycling environments.

SUMMARY OF THE INVENTION

The present invention provides an improved plate heat exchanger, an improved exchanger plate element, and improved methods of construction and use which satisfy the needs and alleviate the problems discussed above. Water of generally any quality, even seawater, can be used as the heating or cooling medium in the inventive plate exchanger system. If needed for cleaning, maintenance, or other reasons, the plate elements of the inventive heat exchanger can be individually disconnected and lifted out of the plate exchanger system without disconnecting the other plate elements and without taking the heat exchanger system out of operation. In addition, the inventive plate elements are simple to clean and maintain and do not require disassembly. The inventive plate heat exchanger system also has a modular configuration which is well suited for rapid deployment and quick plug and play use at any type of site or facility which may be desired. Moreover, the inventive plate heat exchanger is well suited for use in new or existing water source heat pump systems for HVAC or other heating and cooling purposes.

In one aspect, there is provided a heat exchanger which preferably comprises: (a) a tank for delivering a first fluid therethrough and (b) a plurality of exchanger plate assemblies, for delivering a second fluid therethrough, which are independently positionable in, and independently removable from, the tank so that the heat exchanger can continue to operate when any one of the exchanger plate assemblies is removed from the tank. Each of the exchanger plate assemblies preferably comprises: (i) a first outer metal sheet, (ii) a second outer metal sheet, and (iii) an inner flow channel frame structure sealed between the first and the second outer metal sheets. The inner flow channel frame structure preferably has a continuous surrounding perimeter which extends around the inner flow channel frame structure. In addition, the inner flow channel frame structure preferably has a plurality of flow channel dividing structures which extend from the continuous surrounding perimeter of the inner flow channel frame structure to form a plurality of inner flow channels between the first outer metal sheet and the second outer metal sheet, the plurality of inner flow channels including at least an initial flow channel and a final flow channel.

In another aspect, there is provided a heat exchanger plate assembly which preferably comprises: (a) an outer perimeter which surrounds the heat exchanger plate assembly; (b) a first outer metal sheet; (c) a second outer metal sheet; (d) an inner flow channel frame structure sealed between the first and the second outer metal sheets, the inner flow channel frame structure having a continuous surrounding perimeter which extends around the inner flow channel frame structure and is positioned within the outer perimeter of the heat exchanger plate assembly; (e) the inner flow channel frame structure having a plurality of flow channel dividing structures which extend from the continuous surrounding perimeter of the inner flow channel frame structure to form a plurality of inner flow channels between the first outer metal sheet and the second outer metal sheet, the plurality of inner flow channels including at least an initial flow channel and a final flow channel; (f) a plurality of rivets, extending through the first and the second outer metal sheets and through at least most of the flow channel dividing structures of the inner flow channel frame structure, which attach the first and the second outer metal sheets together with the inner flow channel frame structure secured therebetween; and (g) a bonding material which bonds between the inner flow channel frame structure and the first and the second outer metal sheets.

In another aspect, there is provided a method of constructing an independent heat exchanger plate, the method comprising the steps of: (a) coating each side of a flat, metal flow channel frame structure with an epoxy or other bonding material, the flow channel frame structure having a continuous surrounding perimeter and a plurality of flow channel dividing structures which extend from the continuous surrounding perimeter to form a plurality of inner flow channels within the independent heat exchanger plate; (b) positioning the flow channel frame structure between a first outer metal sheet and a second outer metal sheet; and (c) extending and securing rivets through the first and the second outer metal sheets and through at least most of the flow channel dividing structures of the flow channel frame structure to attach the first and the second outer metal sheets together with the flow channel frame structure secured therebetween.

Further objects, features, and advantages of the present invention will be apparent to those in the art upon examining the accompanying drawings and upon reading the following Detailed Description of the Preferred Embodiments.

DETAILED DESCRIPTION OF THE PREFERRED EMBODIMENTS

An embodiment 2 of the plate heat exchanger apparatus provided by the present invention is illustrated in FIGS. 1-9. The inventive plate heat exchanger 2 preferably comprises: (i) a pass-through tank 4 through which a first fluid (e.g., heating or cooling water from a lake, a stream, the ocean, or other source) is delivered; (ii) one or more, preferably a plurality, of inventive exchanger plate assemblies 6 through which a second fluid (e.g., a recirculating clean water stream used in a heat pump system for condensing or evaporating a refrigerant) is delivered, the exchanger plate assemblies 6 being separately and individually, and preferably vertically, positionable in and removable from the tank 4; (iii) a supply manifold 8 attached to the tank 4 for receiving the second fluid and supplying the second fluid to plate assemblies 6 for heating or cooling; and (iv) a discharge manifold 10 attached to the tank 4 for receiving the heated or cooled second fluid from the plate assemblies 6 and discharging the second fluid to a heat pump assembly or other system.

Figure 5:
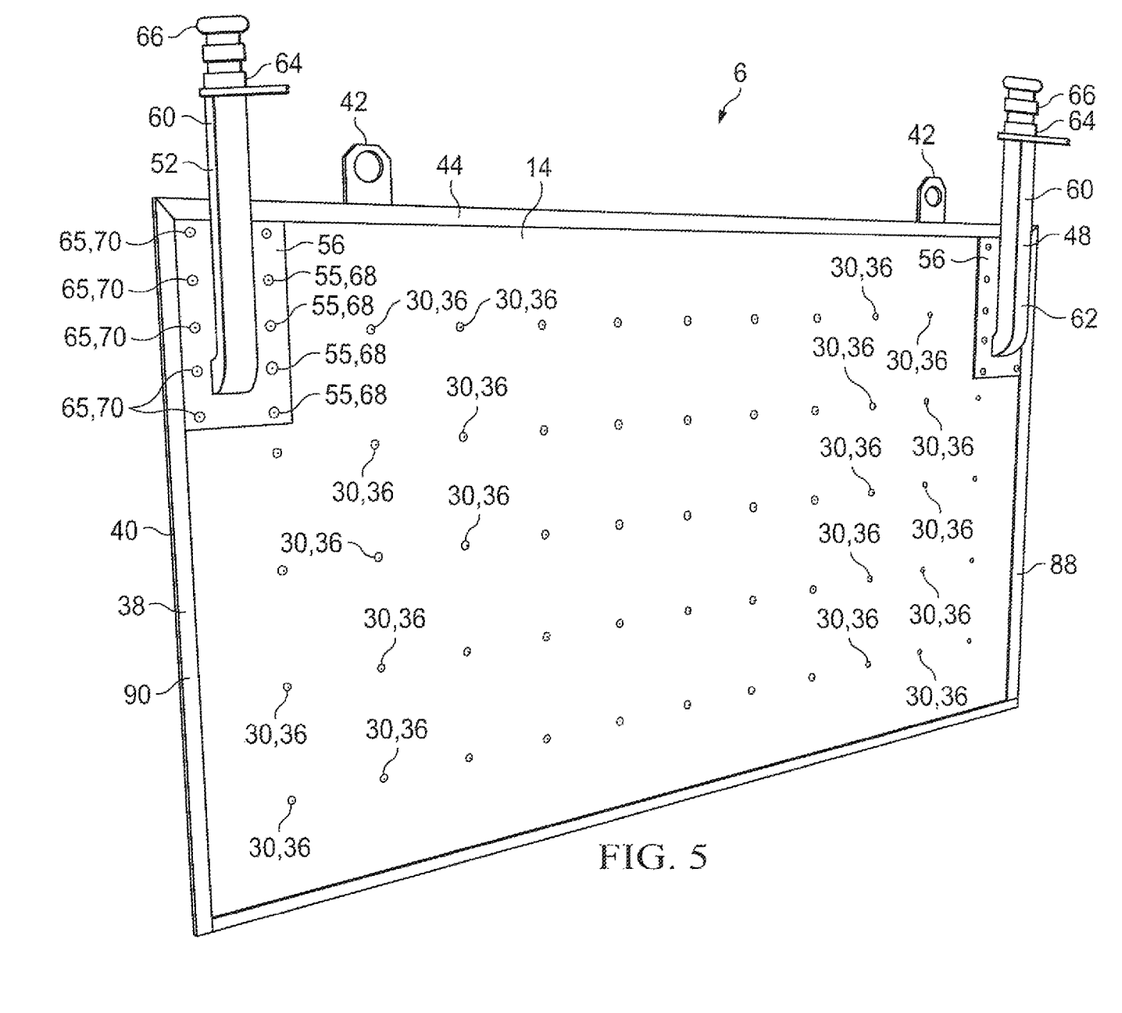
FIG. 5 is a front view of an embodiment 6 of an exchanger plate assembly provided by the present invention.
Figure 6:
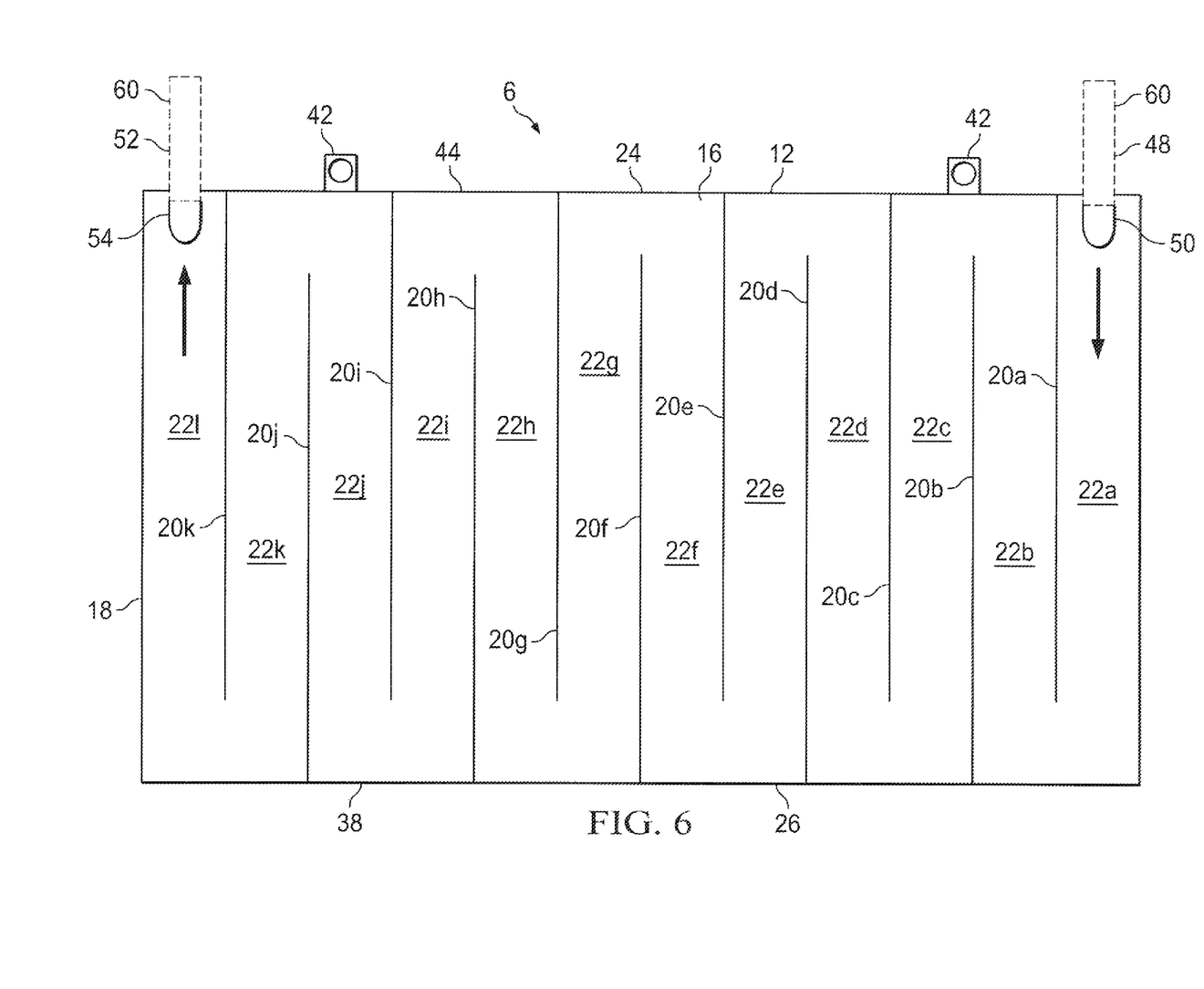
FIG. 6 is a schematic, cutaway, front elevational view of the exchanger plate assembly 6.
Figure 7:
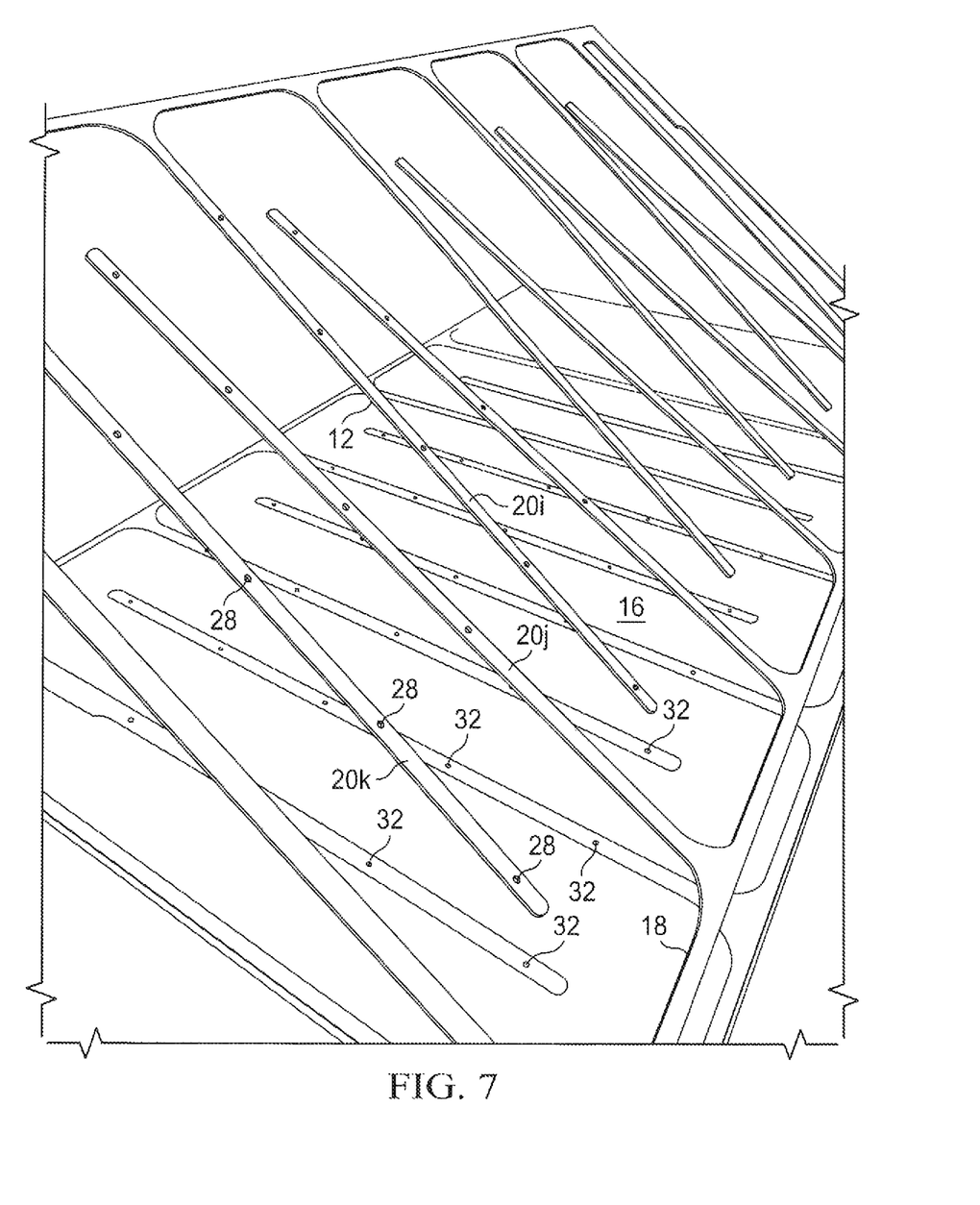
FIG. 7 shows an outer metal sheet 16 and an inner flow channel dividing structure 12 used in the exchanger plate assembly 6.

Each of the exchanger plate assemblies 6 preferably comprises an inner flow channel frame structure 12 which is positioned and sealed between a first outer metal sheet 14 and second outer metal sheet 16. The outer metal sheets 14 and 16 are preferably identical rectangular metal sheets which are formed of aluminum (preferably 6061-T6 aluminum). The inner flow channel structure 12 is also preferably formed of metal and is most preferably formed of aluminum (preferably 6061-T6 aluminum). In a preferred method of construction, the inner flow channel structure 12 is cut from a rectangular metal sheet (preferably by plasma or water cutting) which is identical to the outer metal sheets 14 and 16. The thicknesses of the outer sheets 14 and 16 and of the inner flow channel structure 12 will preferably each be in the range of from $\frac{1}{100}$ to $\frac{9}{16}$ inch and will more preferably be about $\frac{1}{8}$ inch.

The inner frame structure 12 preferably comprises (a) a continuous outer perimeter 18 which entirely surrounds the frame structure 12 and (b) a plurality of flow channel dividing structures 20a-k which extend from the continuous surrounding perimeter 18 of the inner flow channel frame structure 12 to form a plurality of inner flow channels 22a-1 between the first outer metal sheet 14 and the second outer metal sheet 16. The exchanger plate assembly 6 preferably comprises at least four and more preferably up to twelve or more of the inner flow channels 22a-1, including an initial flow channel 22a and a final flow channel 22l.

For a rectangular inner frame structure 12 having a surrounding rectangular perimeter 18 which includes a horizontally extending upper frame segment 24 and a horizontally extending lower frame segment 26, the flow channel dividing structures 20a-k will preferably comprise (i) linear segments 20a, 20c, 20e, 20g, 20i, and 20k which extend vertically downward from the upper horizontal frame segment 24 and have lower ends which are spaced apart from the lower horizontal frame segment 26 and (ii) linear segments 20b, 20d, 20f, 20h, and 20j which extend vertically upward from the lower horizontal frame segment 26 and have upper ends which are spaced apart from the upper horizontal frame segment 24. The downwardly extending channel dividing structures 20a, 20c, 20e, 20g, 20i, and 20k alternate with the upwardly extending channel dividing structures 20b, 20d, 20f, 20h, and 20j to form downwardly extending inner flow channels 22a, 22c, 22e, 22g, 22i, and 22k which alternate with upwardly extending inner flow channels 22b, 22d, 22f, 22h, 22j, and 22l.

For assembling each of the inventive heat exchanger plates 6, a series of rivet holes 28 is preferably pre-drilled or otherwise formed through most, preferably all, of the flow channel dividing structures 20a-k of the inner frame structure 12. Matching rivet holes 30 and 32 are also preferably pre-drilled or otherwise formed through the first and second outer metal sheets 14 and 16. The rivet holes 30 and 32 formed through the first and second outer metal sheets 14 and 16 line up with the rivet holes 28 of the flow channel dividing structures 20a-k when the inner flow channel frame structure 12 is positioned between the outer metal sheets 14 and 16 for assembling the exchanger plate 6.

Figure 8:
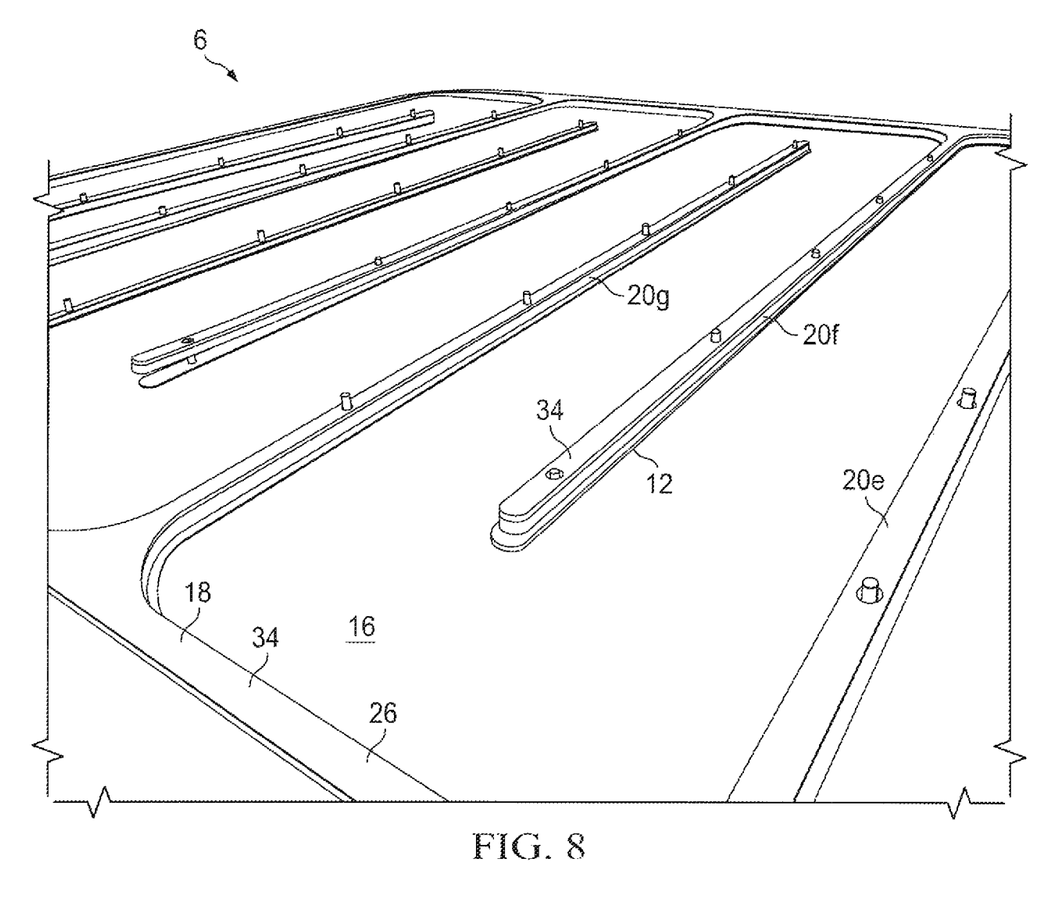
FIG. 8 shows the outer metal sheet 16 and the inner flow channel dividing structure 12 having a bonding material 34 applied thereto.
Figure 9:
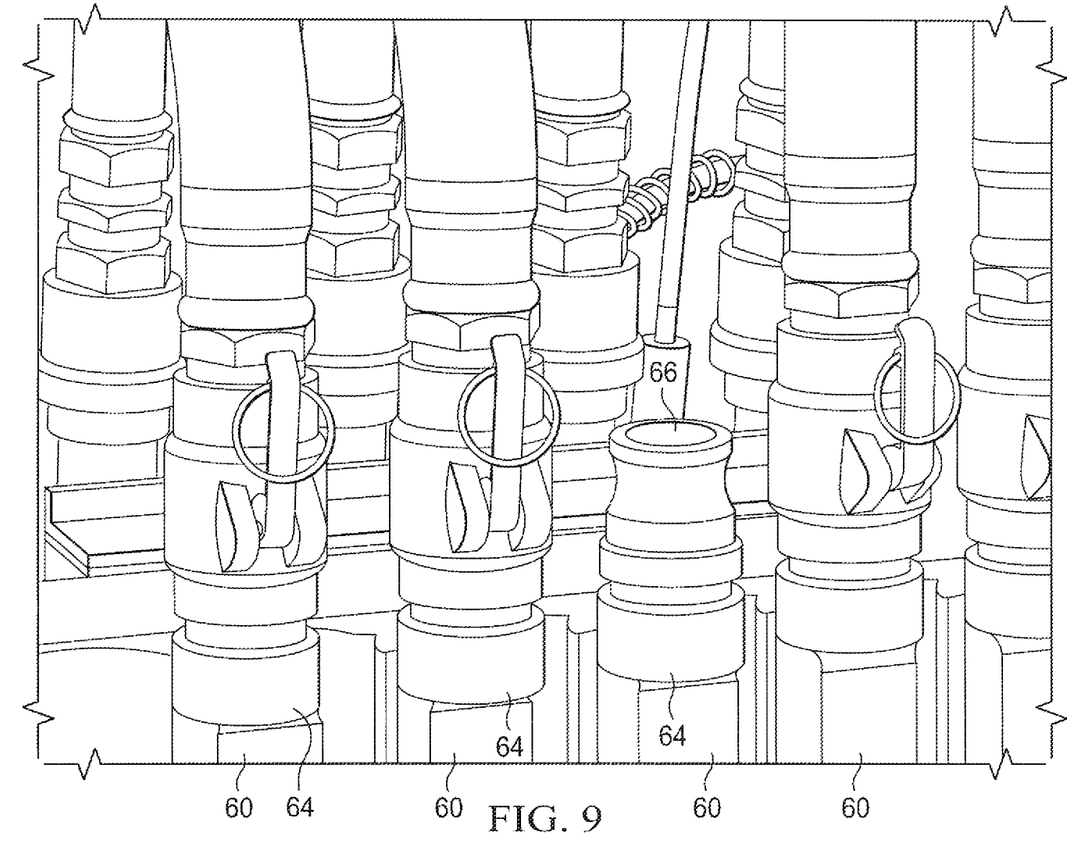
FIG. 9 is a partial discharge end view of the plate heat exchanger 2.

In the inventive method of constructing each of the exchanger plate assemblies 6 of the inventive heat exchanger 2, the flat surfaces on both sides of the continuous outer perimeter 18 and the channel dividing structures 20a-k of the inner flow channel frame structure 12 are coated with a bonding material 34. The flow channel frame structure 12 is then positioned between the first outer metal sheet 14 and the second outer metal sheet 16 and rivets 36 are extended and secured through the aligned rivet holes 28, 30, and 32 of the outer sheets 14 and 16 and the frame structure 12.

The rivets 36 attach the first and the second outer metal sheets 14 and 16 together with the inner flow channel frame structure 12 secured therebetween such that the continuous surrounding perimeter 18 of the inner frame structure 12 is positioned within, coincides with, and will seal the surrounding outer perimeter 38 of the assembled exchanger plate 6. In addition, a plurality of C clamps and/or C clips are temporarily secured around the outer perimeter 38 of the plate assembly 6 in order to clap the outer metal sheets 14 and 16 and the inner frame structure 12 together until the bonding material has been allowed to cure.

When the initial curing is complete, the C clamps and/or C clips are removed and a C channel frame 40 is installed and bonded around the outer perimeter 38 of the exchanger plate assembly 6. The C frame 40 is preferably formed of aluminum. Two or more, preferably a pair, of lifting lugs 42 are welded to or otherwise extend from the horizontal top edge 44 of the C channel frame 40 for using a lift when independently lowering the exchanger plate assembly 6 through and independently hoisting the exchanger plate assembly 6 out of the top opening 46 of the pass-through tank 4.

The bonding material 34 used in the inventive exchanger plate assembly 6 can be any material which (a) is effective for bonding and sealing, and is compatible with, the aluminum or other components of the inventive exchanger plate assembly 6 and (b) is compatible with and resistant to the fluids which are delivered through the inventive plate exchanger 2. The bonding material 34 is preferably an epoxy bonding material. An example of an epoxy bonding material which is well suited for use in the inventive exchanger plate assembly 6 is Scotch-Weld™ Epoxy Adhesive 2216 B/A available from 3M Company.

All areas of possible surface contact between the inner flow channel frame structure 12 and the outer metal sheets 14 and 16 are preferably coated with the bonding material 34. Consequently, the bonding material 34 prevents direct contact (i) between the first outer metal sheet 14 and both the continuous surrounding perimeter 18 and the flow channel dividing structures 20a-k of the inner flow channel frame structure 12 and (ii) between the second outer metal sheet 16 and both the continuous surrounding perimeter 18 and the flow channel dividing structures 20a-k of the inner flow channel frame structure 12.

Because the rivets 36 extend through the flow channel dividing structures 20a-k which are bonded and sealed between the outer metal sheets 14 and 16 by the bonding material 34, the rivets 36 are also isolated from contacting the clean water or other fluid which is delivered through the exchanger plate assembly 6. This rivet and bonding technique also eliminates the need for metallurgic welds on the portion of the exchanger plate assembly 6 which is submerged in the tank 4. This enhances the structural and mechanical strength of the plate assembly 6 while also eliminating the danger of weld cracking which commonly occurs when welds are exposure to corrosive, thermocycling environments.

As with the outer metal sheets 14 and 16, the rivets 36 of the exchanger plate assembly 6 are preferably formed of aluminum and are more preferably formed of 6061-T6 aluminum. Aluminum provides excellent thermal conductivity and is also pliable. Over time, stretching and malforming caused by thermocycling and metallurgic welding can cause structural weakening and cracks. Because the rivet and epoxy construction technique used in the present invention eliminates welding in exposed areas, the 6060-T6 aluminum components which are preferably used in the inventive plate assembly 6 will retain their original heat-treated properties. Consequently, the original strength and rigidity of the plate assembly 6 are maintained to provide a more reliable and longer lasting plate. In addition, when every portion of the exchanger blade assembly 6 which is in contact with the water in the tank 4 is formed of aluminum, the possibility of galvanic corrosion is eliminated.

Each of the inventive exchanger plate assemblies 6 preferably also comprises: (a) an inlet flow connection 48 which is in fluid communication with the initial flow channel 22a via an inlet opening (preferably an elongate slot opening) 50 which is formed through the first outer metal sheet 14 at or near the top of the initial flow channel 22a and (b) an outlet flow connection 52 which is in fluid communication with the final flow channel 22l via an outlet opening (preferably an elongate slot opening) 54 which is formed through either the first or the second outer metal sheet 14 or 16 at or near the top of the final flow channel 22l. The inlet and outlet flow connections 48 and 52 are preferably identical and are preferably both installed on the same side 14 of the exchanger plate assembly 6.

The inlet flow connection 48 and the outlet flow connection 52 preferably each comprise: a face plate 56 having an opening therethrough which matches the size and the shape of the inlet opening 50 of the initial flow channel 22a or the outlet opening 54 of the final flow channel 22l; a conduit 60 having a proximal end portion 62 which is welded along the face plate 56 over and in fluid communication with the face plate opening; two vertically extending rows of rivet holes 55 and 65 formed through the face plate 56 on opposite sides of the conduit 60; and an internally threaded connection 64 provided on the distal end of the conduit 60 for threadedly securing a male cam fitting 66 on the end of the conduit 60.

In the inventive method of constructing each of the exchanger plate assemblies 6, each of the inlet and outlet flow connections 48 and 52 is preferably installed on the plate assembly 6 by: (a) coating the flat side of the face plate 56 around the face plate opening with a bonding material of the type described above; (b) placing the flow opening of the face plate over the inlet or outlet opening 50 or 54 of the initial or the final flow channel 22a or 22l of the plate assembly 6 such that the coated flat side of the face plate 56 is placed against the first or the second outer metal sheet 14 or 16; (c) extending and securing rivets 68 through the outer metal sheets 14 and 16, the flow channel dividing structure 20a or 20k of the inner frame structure 12, and the first row of face plate rivet holes 55; and (d) extending and securing rivets 70 through the outer metal sheets 14 and 16, the perimeter portion 18 of the inner frame structure 12, and the second row of face plate rivet holes 65.

Figure 2:
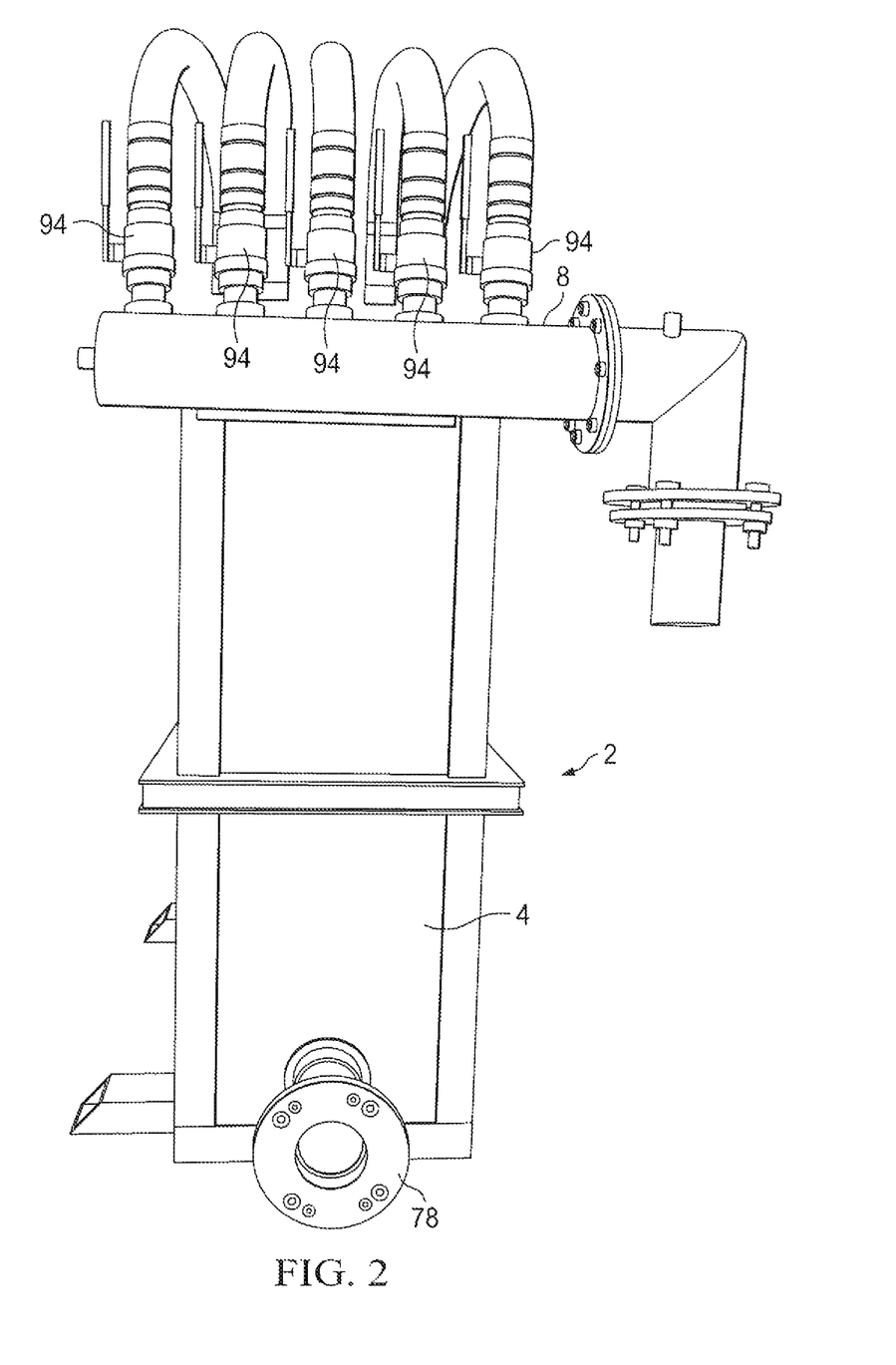
FIG. 2 is an elevational end view of the plate heat exchanger 2.
Figure 3:
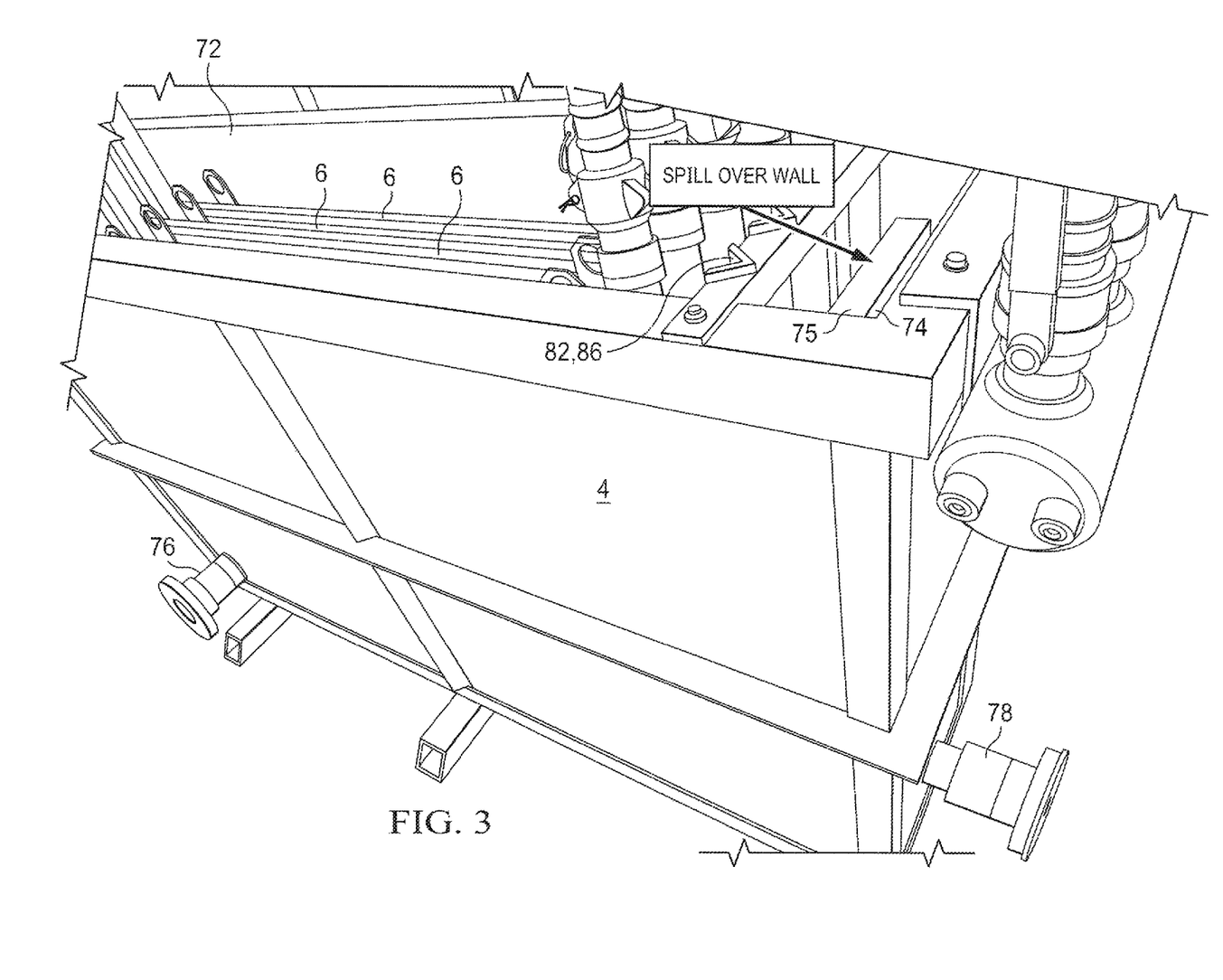
FIG. 3 is a top perspective view of the plate heat exchanger 2.

The pass-through tank 4 of the inventive plate heat exchanger 2 preferably comprises an internal spill-over wall 75 which extends upwardly from the bottom of the tank 4 and divides the interior of the tank 4 into (i) a heat transfer compartment 72 in which one or more, preferably a plurality, of the exchanger plate assemblies 6 are vertically received and (ii) a spill-over compartment 74. The spill-over wall 75 maintains a level of the water or other tank fluid supplied to the tank 4 which is at or near the tops of the exchanger plate assemblies 6, and also ensures that this fluid level is always present in the heat transfer compartment 72 (i.e., ensures that the heat transfer compartment is not unintentionally emptied), even if the flow of the tank fluid is lost.

The tank 4 further comprises: a tank inlet connection 76 which is positioned at or near the bottom of the tank 4 at or near the end of the heat transfer compartment 72 which is opposite the spill-over wall 75; a tank outlet connection 78 which is positioned at or near the bottom of the spill-over compartment 74; and two opposing removable guide rail structures 80 and 82 which are positioned in the heat transfer compartment 72 near the opposing longitudinal ends thereof.

Figure 4:
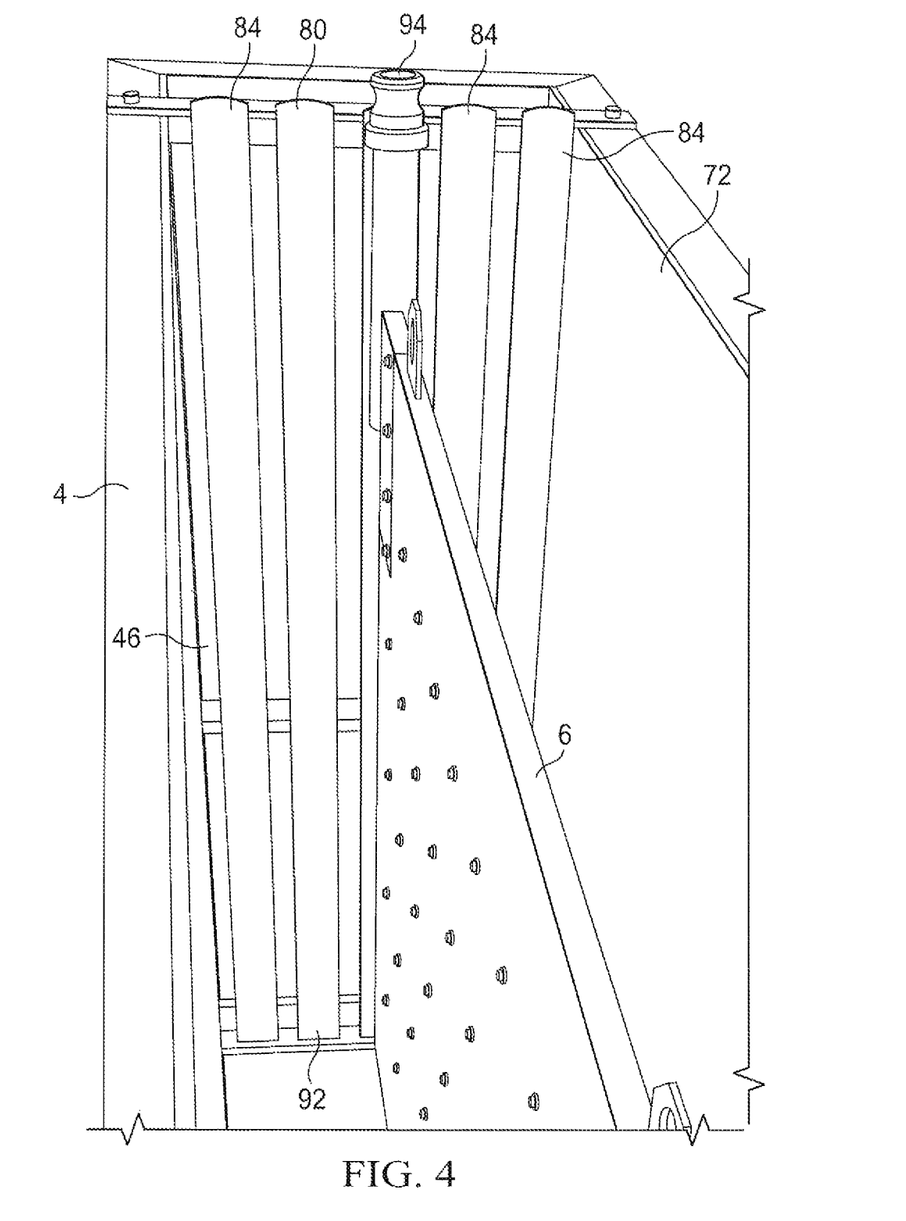
FIG. 4 is a partial top perspective view of the plate heat exchanger 2.

The opposing guide rail structures 80 and 82 provide opposing pairs of vertical slots 84 and 86 for (a) receiving and guiding the vertical side edges 88 and 90 of the rectangular plate assemblies 6 as they are individually lowered through the top opening 46 of the tank 4 into the heat transfer compartment 72 and (b) holding the plate assemblies 6 in vertical, spaced, side-by-side positions in the heat transfer compartment to allow the water or other fluid in the tank to flow between the plate assemblies 6. The guide rail structures 80 and 82 also have closed bottom ends 92 which are spaced above the bottom of the tank 4 for holding the exchanger plate assemblies 6 in suspension to further facilitate the flow of the fluid in the heat transfer compartment 72 and to keep the lower ends of the plate assemblies 6 out of any sediment which might collect in the bottom of the tank 4.

All of the interior metal surfaces and the interior welded seams of the tank 4 are preferably coated with a coal tar epoxy primer or other suitable primer material and then coated with an epoxy sealant, such as, e.g., Marine Adhesive Sealant 5200 available from 3M Company, to prevent the water or other fluid in the tank from contacting the interior surfaces and welds. In addition, the metal inlet and outlet connections 74 and 76 of the tank 4 preferably have non-metallic liners 77 extending therethrough which protect the metal tank connections 74 and 76 from being contacted by the tank fluid. The non-metallic liners 77 for the tank connections 74 and 76 are preferably formed of polyethylene or fiberglass and are more preferably formed of polyethylene.

The inventive plate heat exchanger 2 and the inventive exchanger plate assemblies 6 used therein allow the individual plate assemblies 6 to be separately removed from and returned to the pass-through tank 4 for cleaning, maintenance, or any other purpose such that the inventive plate exchanger 2 can remain on-line and the remaining exchanger plate assemblies 6 can continue to operate when any one or more of the plate assemblies 6 has or have been removed.

To allow each of the exchanger plate assemblies 6 to be individually isolated, removed, and returned in this manner, the inventive plate heat exchanger 2 preferably further comprises for each of the plate assemblies 6: (i) a separate supply shut-off valve 94 at the supply manifold 8; (ii) a flexible supply conduit (preferably a braided stainless steel hose) 96 which extends from the supply shut-off valve 94; (iii) a quick connect connector 98 (preferably a female camlock fitting for receiving the male cam fitting 66 of the inlet flow connection 50 of the plate assembly 6) provided on the distal end of flexible supply conduit 96; (iv) a separate discharge shut-off valve 100 at the discharge manifold 10; (v) a flexible discharge conduit (preferably a braided stainless steel hose) 102 which extends from the discharge shut-off valve 100; and (vi) a quick connect connector 104 (preferably a female camlock fitting for receiving the male cam fitting 66 of the outlet flow connection 52 of the plate assembly 6) provided on the distal end of flexible discharge conduit 102.

Figure 1:
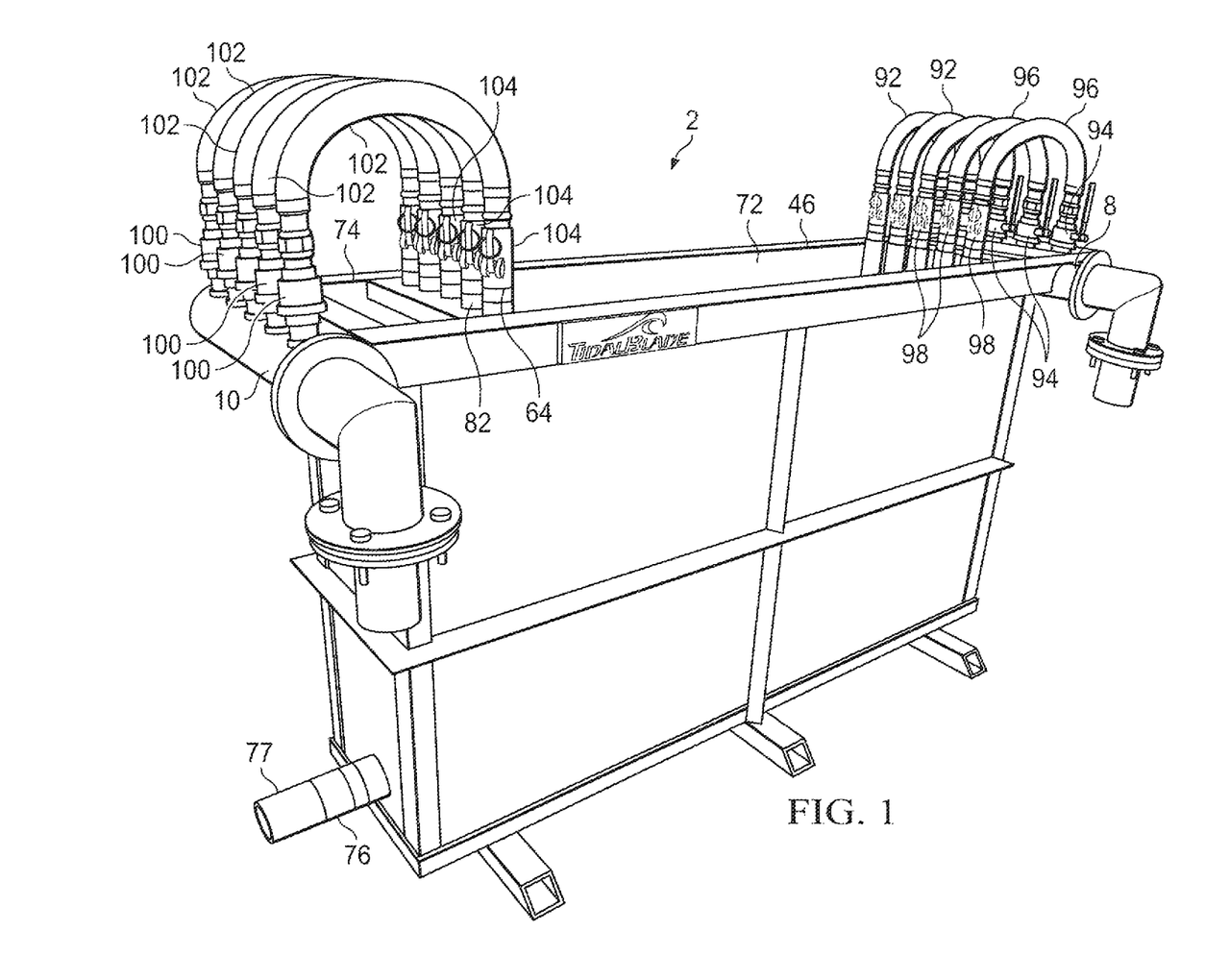
FIG. 1 is a perspective view of an embodiment 2 of the plate heat exchanger provided by the present invention.

To take one of the exchanger plate assemblies 6 offline for cleaning or maintenance, the supply shut-off valve 94 and the discharge shut-off valve 100 for the plate assembly are closed, the quick connect connectors 98 and 104 for the flexible supply and discharge conduits 96 and 102 are released from the plate inlet and outlet flow connections 48 and 52, and the lifting lugs 42 of the plate assembly 6 are used to lift the plate assembly 6 out of the tank 4. To then return the removed plate assembly 6 to operation, the lifting lugs 42 are used to lower the plate assembly 6 into the tank 4, the quick connect connectors 98 and 104 on the supply and discharge conduits 96 and 102 are reconnected to the inlet and outlet flow connections 48 and 52 of the plate 6, and the supply and discharge shut-off valves 94 and 100 are opened.

The inventive exchanger plate assembly 6 has a smooth design with minimal right angles and edges to enable quick and easy cleaning. When using water of substantially any quality in the tank 4, the exterior of the inventive exchanger plate assembly 6 can be cleaned with a nylon bristle brush using DAWN dishwashing liquid or other cleaner such as SIMPLE GREEN. When the fluid delivered through the plate assembly 6 is clean potable water, the inner flow channels 22a-1 of the plate assembly 6 can be cleaned by simply flushing the interior of the plate assembly 6 with clean water and/or a vinegar and baking soda solution.

Thus, the present invention is well adapted to carry out the objects and attain the ends and advantages mentioned above as well as those inherent therein. While presently preferred embodiments have been described for purposes of this disclosure, numerous changes and modifications will be apparent to those in the art. Such changes and modifications are encompassed within this invention as defined by the claims.

What is claimed is:

1. A heat exchanger comprising:
a tank for delivering a first fluid therethrough and
a plurality of exchanger plate assemblies, for delivering a second fluid therethrough, which are independently positionable in, and independently removable from, the tank so that the heat exchanger can continue to operate when any one of the exchanger plate assemblies is removed from the tank, each of the exchanger plate assemblies comprising
a first outer metal sheet,
a second outer metal sheet,
an inner flow channel frame structure sealed between the first and the second outer metal sheets, the inner flow channel frame structure having a continuous surrounding perimeter which extends around the inner flow channel frame structure,
the inner flow channel frame structure having a plurality of flow channel dividing structures which extend from the continuous surrounding perimeter of the inner flow channel frame structure to form a plurality of inner flow channels between the first outer metal sheet and the second outer metal sheet, the plurality of inner flow channels including at least an initial flow channel and a final flow channel, and
a plurality of rivets, extending and secured through the first and the second outer metal sheets and through at least most of the flow channel dividing structures of the inner flow channel frame structure, which attach the first and the second outer metal sheets together with the inner flow channel frame structure secured therebetween.

2. The heat exchanger of claim 1 further comprising a bonding material which bonds between the inner flow channel frame structure and the first and the second outer metal sheets.

3. The heat exchanger of claim 2 comprising the bonding material preventing direct contact (i) between the first outer metal sheet and both the continuous surrounding perimeter and the flow channel dividing structures of the inner flow channel frame structure and (ii) between the second outer metal sheet and both the continuous surrounding perimeter and the flow channel dividing structures of the inner flow channel frame structure.

4. The heat exchanger of claim 1 further comprising there being at least four of said inner flow channels between the first outer metal sheet and the second outer metal sheet, the inner flow channels being alternating downward and upward flow channels.

5. The heat exchanger of claim 1 further comprising each of the exchanger plate assemblies including:
an inlet flow connection in fluid communication with the initial flow channel via an inlet opening of the initial flow channel formed through the first outer metal sheet and
an outlet flow connection in fluid communication with the final flow channel via an outlet opening of the final flow channel formed through the first or the second outer metal sheet.

6. The heat exchanger of claim 5 comprising:
the inlet flow connection of each of the exchanger plate assemblies comprising
a face plate having an opening therethrough which is positioned over the inlet opening of the initial flow channel,
an inlet conduit which extends from, and is in fluid communication with the opening of, the face plate of the inlet flow connection,
a plurality of rivets extending through (i) the first and the second outer metal sheets, (ii) one of the flow channel dividing structures of the inner flow channel frame structure, and (iii) the face plate of the inlet flow connection, and
a plurality of rivets extending through (i) the first and the second outer metal sheets, (ii) the continuous surrounding perimeter of the inner flow channel frame structure, and (iii) the face plate of the inlet flow connection and
the outlet flow connection of each of the exchanger plate assemblies comprising
a face plate having an opening therethrough which is positioned over the outlet opening of the final flow channel,
an outlet conduit which extends from, and is in fluid communication with the opening of, the face plate of the outlet flow connection,
a plurality of rivets extending through (i) the first and the second outer metal sheets, (ii) one of the flow channel dividing structures of the inner flow channel frame structure, and (iii) the face plate of the outlet flow connection, and
a plurality of rivets extending through (i) the first and the second outer metal sheets, (ii) the continuous surrounding perimeter of the inner flow channel frame structure, and (iii) the face plate of the outlet flow connection.

7. The heat exchanger of claim 6 further comprising:
an amount of a bonding material which bonds between the face plate of the inlet flow connection and the first outer metal sheet and
another amount of the bonding material which bonds between the face plate of the outlet flow connection and the first or the second outer metal sheet.

8. The heat exchanger of claim 5 further comprising:
a supply manifold for the second fluid;
a discharge manifold for the second fluid;
each of the exchanger plate assemblies having a separate flexible supply conduit which extends from the supply manifold and has a connector on a distal end of the flexible supply conduit for removably connecting the flexible supply conduit to the inlet flow connection of the exchanger plate assembly; and
each of the exchanger plate assemblies having a separate flexible discharge conduit which extends from the discharge manifold and has a connector on a distal end of the flexible discharge conduit for removably connecting the flexible discharge conduit to the outlet flow connection of the exchanger plate assembly.

9. The heat exchanger of claim 8 comprising the connectors provided on the flexible supply conduits and on the flexible discharge conduits each comprising a female camlock fitting which is receivable on a male camlock fitting provided on the inlet or the outlet flow connection of the exchanger plate assembly.

10. The heat exchanger of claim 8 further comprising separate shutoff valves for separately and independently shutting off flow through each of the flexible supply conduits and each of the flexible discharge conduits.

11. The heat exchanger of claim 1 further comprising:
the plurality of exchanger plate assemblies being separately receivable through a top opening of the tank for vertically positioning the plurality of exchanger plate assemblies in the tank and
each of the exchanger plate assemblies having at least a pair of lifting lugs which extend from the exchanger plate assembly for separately lowering the exchanger plate assembly into and separately lifting the exchanger plate assembly out of the tank.

12. A heat exchanger comprising:
a tank for delivering a first fluid therethrough, the tank having an upper end and a top opening at the upper end;
a plurality of independent exchanger plates, for delivering a second fluid therethrough, which are separately positionable in, and separately removable from, the tank so that the heat exchanger can continue to operate when any one of the independent exchanger plates is removed from the tank, the plurality of the independent exchanger plates being separately receivable through the top opening of the tank for vertically positioning the plurality of independent exchanger plates in the tank, and each of the independent exchanger plates comprising
a first outer metal sheet,
a second outer metal sheet, and
a plurality of inner flow channels between the first outer metal sheet and the second outer metal sheet, the plurality of inner flow channels including at least an initial flow channel which receives the second fluid and a final flow channel, downstream of the initial flow channel, from which the second fluid is discharged;
a plurality of opposing pairs of vertical slots provided in the tank, each one of the independent exchanger plates being vertically receivable in, and vertically removable from, a separate one of the opposing pairs of vertical slots provided in the tank;

a supply manifold, for the second fluid, attached to the tank at the upper end of the tank;

a discharge manifold, for the second fluid, attached to the tank at the upper end of the tank;

each of the independent exchanger plates having a separate flexible supply conduit which (i) extends upwardly from the supply manifold and then downwardly toward the top opening of the tank to an inlet flow connection of the independent exchanger plate which extends upwardly from the independent exchanger plate and (ii) has a connector on a distal end of the flexible supply conduit for removably connecting the flexible supply conduit to the inlet flow connection of the independent exchanger plate; and each of the independent exchanger plates having a separate flexible discharge conduit which (i) extends upwardly from the discharge manifold and then downwardly toward the top opening of the tank to an outlet flow connection of the independent exchanger plate which extends upwardly from the independent exchanger plate and (ii) has a connector on a distal end of the flexible discharge conduit for removably connecting the flexible discharge conduit to the outlet flow connection of the independent exchanger plate.

13. The heat exchanger of claim 12 further comprising each one of the independent exchanger plates having an opposing pair of vertical edges which are vertically receivable in, and vertically removable from, said separate one of the opposing pairs of vertical slots provided in the tank.

14. The heat exchanger of claim 12 further comprising the independent exchanger plates being held by the opposing pairs of vertical slots in side-by-side vertical positions in the tank with spaces between the independent exchanger plates for flow of the first fluid through the spaces.

15. The heat exchanger of claim 12 further comprising the inner flow channels being alternating connected downward and upward flow channels.

16. The heat exchanger of claim 12 further comprising separate shutoff valves for separately and independently shutting off flow through each of the flexible supply conduits and each of the flexible discharge conduits.

17. A heat exchanger comprising:
a tank configured for delivering a first fluid therethrough, the tank having an upper end and a top opening at the upper end;
one or more exchanger plates, separately positionable in and removable from the tank, for delivering a second fluid through the one or more exchanger plates;
each of the one or more exchanger plates being receivable through the top opening of the tank for vertically positioning the one or more exchanger plates in the tank;
each of the one or more exchanger plates comprising
a first outer metal sheet,
a second outer metal sheet, and
a plurality of inner flow channels between the first outer metal sheet and the second outer metal sheet, the plurality of inner flow channels including at least an initial flow channel which receives the second fluid and a final flow channel, downstream of the initial flow channel, from which the second fluid is discharged;
each of the one or more exchanger plates having a flexible supply conduit which (i) extends downwardly toward the top opening of the tank to an inlet flow connection of the exchanger plate which extends upwardly from the exchanger plate and (ii) has a connector on a distal end of the flexible supply conduit for removably connecting the flexible supply conduit to the inlet flow connection of the exchanger plate; and
each of the one or more exchanger plates having a flexible discharge conduit which (i) extends downwardly toward the top opening of the tank to an outlet flow connection of the exchanger plate which extends upwardly from the exchanger plate and (ii) has a connector on a distal end of the flexible discharge conduit for removably connecting the flexible discharge conduit to the outlet flow connection of the exchanger plate.

18. The heat exchanger of claim 17 wherein the heat exchanger has only one of the one or more exchanger plates.

19. The heat exchanger of claim 18 further comprising:
an opposing pair of vertical slots provided in the tank and the exchanger plate having an opposing pair of vertical edges which are vertically receivable in, and vertically removable from, the opposing pair of vertical slots provide in the tank.

* * * * *